May 21, 1963

J. R. CLARKSON 3,090,591

FLOW CONTROL VALVE

Filed Dec. 22, 1958

INVENTOR
JOHN ROBERT CLARKSON

BY Strauch, Nolan & Neale
ATTORNEYS

May 21, 1963

J. R. CLARKSON 3,090,591

FLOW CONTROL VALVE

Filed Dec. 22, 1958

INVENTOR
JOHN ROBERT CLARKSON.

BY Strauch, Nolan & Neale
ATTORNEYS

3,090,591
FLOW CONTROL VALVE
John Robert Clarkson, Palo Alto, Calif., assignor, by mesne assignments, to The J. R. Clarkson Company, a corporation of California
Filed Dec. 22, 1958, Ser. No. 782,039
11 Claims. (Cl. 251—5)

The present invention relates to improvements in valves and more particularly to improvements in valves of the type which will be herein referred to as "radially constrictible unobstructed venturi valves." These valves are used primarily in pipelines carrying solids suspended in liquid. This term is intended to refer to a valve providing an unobstructed substantially circular inlet port the diameter of which may be selectively varied to control flow between full flow and shut off while maintaining the port substantially circular over the major portion of such control range. An example of such a valve is disclosed in Swedish Patent No. 132,054 granted April 5, 1951, to C. D. Carlsson et al.

Valves of the type disclosed in said patent have many advantages over other types of valves, particularly for use in pipelines carrying fluids in which solids are suspended, in that they provide an unobstructed circular port in line with the pipe in which the valve is interposed and in that the size of flow metering port can be reduced substantially to cutoff while maintaining its circularity and concentricity with the pipe to control the rate of flow over a large portion of the range between full flow and cutoff with minimum head loss at the valve due to turbulence. This maintenance of port circularity over a wide range of flow is attributable primarily to the provision of a very thick annular wall at least at the central region in which the sleeve is constrictible under the influence of externally applied fluid pressure about the circumference of the center portion of the sleeve. The design of the Swedish patent provided a one to one ratio between radial wall thickness and port diameter in that region to achieve this result. As distinguished from this type of operation, in a thin walled sleeve valve, the sleeve, at a very early stage of closure, collapses to a non-circular configuration such as a figure eight, for example, with resultant turbulence and head loss.

Valves as disclosed in said Swedish patent have certain limitations. In such valves the sleeve is received within and is substantially coextensive in length with the bore of a generally tubular central metal casing portion the ends of which are closed by metal end plates provided with annular bosses projecting within to support and clamp the reduced thickness ends of the sleeve. This arrangement, due to the frictional contact between the sleeve and the interior of the casing and exterior of the end plate bosses, makes disassembly of the valve for replacement of the sleeve a very difficult and time consuming operation, particularly in the field.

Further, in order to assure that the sleeve will always return to its initial fully open configuration after relief of the externally applied pressure when the valve has been set at fully or partially closed conditions for long periods of time, the sleeve as originally designed was made entirely of natural rubber or with a thin coating of synthetic rubber on its exterior surface (the surface exposed to the hydraulic fluid, as distinguished from the line fluid). Natural rubber was used because of its ability to flow under proper pressure permitting the sleeve to close with a substantially round hole in the center of flow and because of its memory characteristics by which it will return to its original shape upon pressure release. In many applications, however, natural rubber may cause contamination of the material passing through the valve rendering use of a valve embodying natural or pure gum rubber exposed to line fluid impossible.

A further limitation of said Swedish patented design resides in the fact that it is not practically adapatable to any but very small diameter pipe sizes, in the order of 1½ to 2″ diameter port size. If a one to one ratio of port diameter to sleeve radial thickness is maintained in a 6″ valve, for example, the overall diameter of the sleeve itself is 18″. It would require nearly 400 p.s.i. pressure for closure and the total weight of the valve would exceed 1100 lbs. The high cost and unusual weight and bulkiness of such a valve makes it totally impractical. Experimentation has shown however that if the radial thickness of the sleeve wall is reduced to one half the port diameter, when the valve is put in operation and the sleeve subjected to a closing pressure as low as 20 to 25 p.s.i., one side begins to collapse and close in while the opposite side has very little movement. While such a valve is useful as an off-on valve, due to the noncircularity of the port over any extended range of applied closing pressure it is of little value as a control or throttle valve.

Another valve of the type generally under consideration is that shown in Devereux Patent No. 1,657,663. The disadvantages of the valves described in the various embodiments of this patent are more pronounced than those of the corresponding valve shown and described in the Swedish patent.

For example, the most pertinent embodiment shown by Devereux, that of FIGURES 9 and 10, provides a structure wherein a non-uniform pressure is applied to an elastomeric annulus which is constructed of a material similar to that described in the Swedish application. Devereux's constrictor element must be manually actuated, a disadvantage not found in the Swedish patent. Still other disadvantages of the Devereux patent are readily detectable upon examination thereof.

The disadvantages of a device such as that described in the Swedish and Devereux patents were, for the most part, overcome by the novel device disclosed in my copending application Serial No. 661,488, now Patent No. 3,047,008, filed May 24, 1957. The present invention provides improvements over the valve disclosed in said copending application which result in improved flow patterns through the valve with minimum turbulence, greater ease of replacement of worn parts, reduction in operating costs, maintenance of port circularity throughout a wider range of constriction of the valve sleeve, and other advantages which will become apparent from the ensuing description of the novel device of this invention.

It is accordingly the primary object of this invention to improve the novel valve described in copending application Serial No. 661,488, now Patent No. 3,047,008.

Other objects of this invention are to provide an improved fluid pressure actuated radially constrictible unobstructed venturi valve;

(1) in which the portion of the valve subject to wear from contact with the line fluid is of such construction that it may be inexpensively manufactured and readily removed and replaced when worn;

(2) in which all metal parts of said valve are shielded from contact with corrosible materials passing therethrough;

(3) in which the venturi valve is more streamlined, having in its constricted condition more gradually tapering venturi walls for any given port opening, thereby resulting in maintenance of laminar flow of fluids therethrough throughout a wider range of constriction of the valve sleeve port;

(4) which permits a finer degree of control than has heretofore been possible with prior like devices;

(5) which provides true circularity from its full open position to approximately 70% reduction in diameter of the valve sleeve; and (6) in which is incorporated a novel retainer design for the sleeve elements of said valve, to permit ease of sleeve removal and replacement.

These and other objects of the present invention will become more fully apparent by reference to the appended claims and as the following detailed description proceeds in reference to the accompanying drawings wherein:

Figure 1:
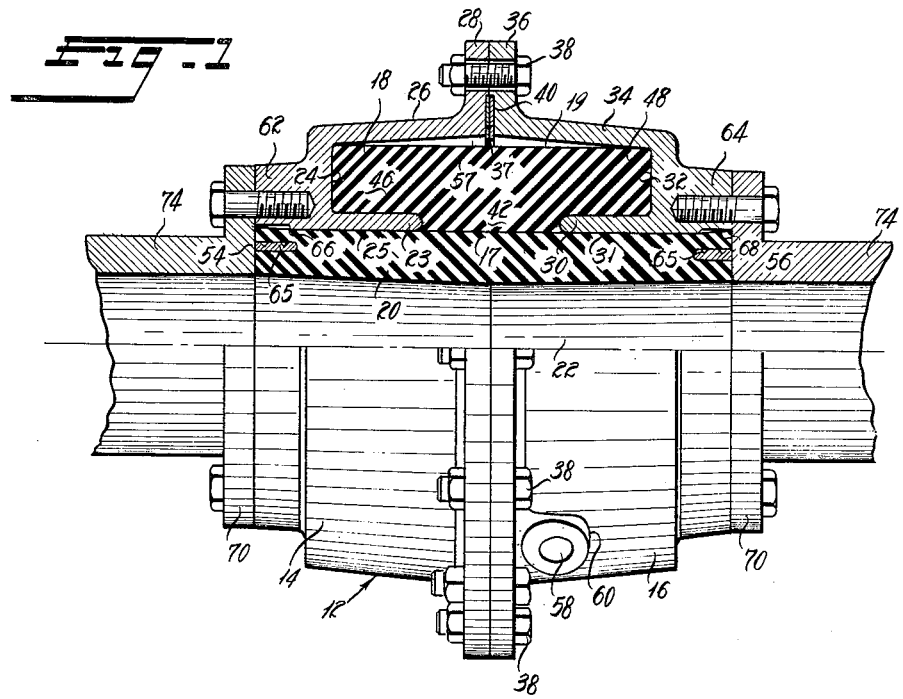
FIGURE 1 is a fragmentary section of a view in side elevation of a valve embodying the principles of the present invention.
Figure 2:
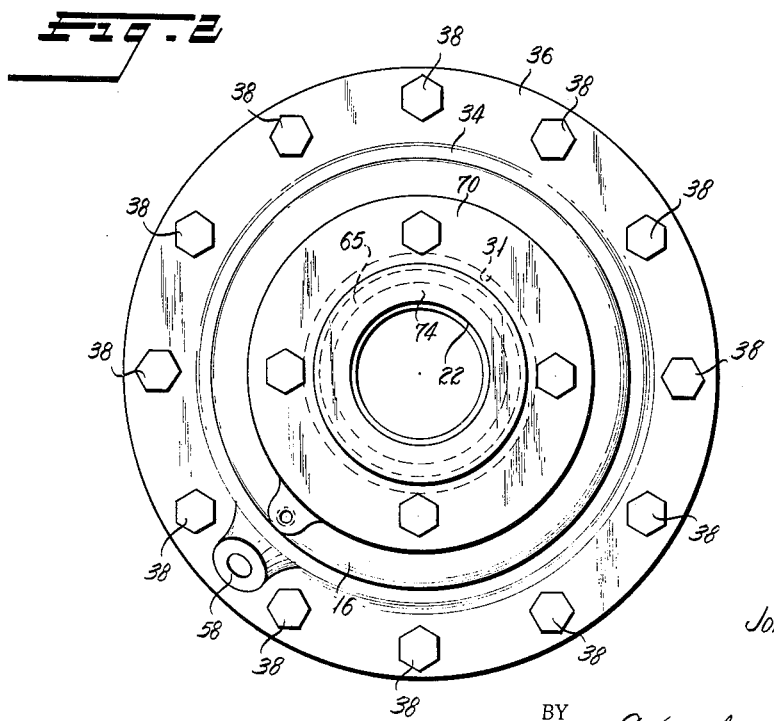
FIGURE 2 is an end view of the valve of FIGURE 1.

Referring first to FIGURES 1 and 2, the novel valve of the present invention comprises a casing 12 formed of two rigid (preferably cast metal) parts 14 and 16, an outer molded elastomeric bushing 18 (preferably of pure gum rubber) housed and partially confined therein and an inner molded elastomeric sleeve 20 (preferably of a synthetic, wear-resistant rubber) which defines, in its relaxed condition, a substantially cylindrical through passage 22 which at its opposite ends is preferably equal in diameter to the internal diameter of the pipe line 74 in which the valve assembly 10 is interposed and which at its axial mid-point is of slightly lesser diameter, thereby defining a uniformly tapered converging-diverging passage symmetrical about a transverse central cross-section. Due to the unobstructed in-line port arrangement, it has been found that in certain instances a port diameter smaller than the pipe line size is acceptable. For example, a 5″ diameter port valve in a 6″ diameter pipe line has so much less head loss than other commercially available types of valves, it is acceptable commercially with a fixed venturi inlet and outlet. However, where this is done, separate standard reducer fittings (not shown) are required, to adapt the smaller valve to the larger pipeline.

Casing part 14 is a fluid tight unit of integral cast construction and comprises an annular flange 23, a radial wall 24 extending outwardly from the exterior of flange 23, a slightly conical wall 26 fixed to the periphery of radial wall 24 and extending toward the center of the valve but at a slight angle outwardly from the axis of annular flange 23, and a radial attachment flange 28 fixed to the other end of cylindrical wall 26. Casing part 16 is a fluid tight unit also of integral cast construction complementary in form to part 14 and similarly comprises an annular flange 30, a radial wall 32, a slightly conical wall 34 and a radial flange 36. The corresponding portions of casing parts 14 and 16 are identical. Casing parts 14 and 16 are assembled and clamped together by a plurality of equiangularly disposed bolts 38 passing through aligned apertures in the abutting flanges 28 and 36, fluid tight relation between the flanges 28 and 36 being maintained by a sealing gasket 40 received in compressed relation between opposed mating circumferentially extending axially facing recessed areas 27 and 37 in the abutting faces of flanges 28 and 36.

Figure 5:
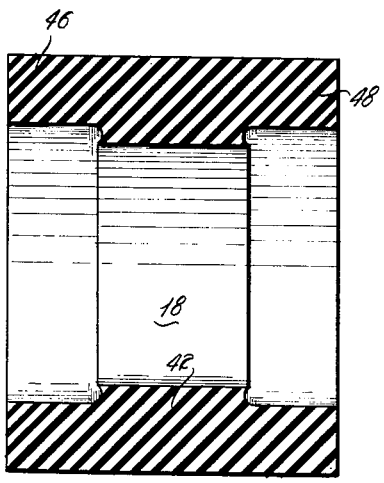
FIGURE 5 is an axial sectional view of the outer molded bushing of the valve of FIGURE 1.
Figure 6:
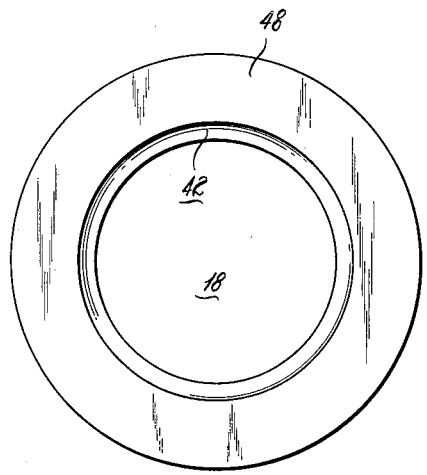
FIGURE 6 is an end view of the bushing of FIGURE 5.

As is best illustrated in FIGURES 5 and 6, the outer bushing 18 is an annulus having a central thick-walled cylinder portion 42 of substantial radial thickness in relation to the annular extensions or attachment flanges 46 and 48 at each end thereof which are of lesser radial thickness and spaced radially outwardly from the bore of portion 42.

In assembly, as shown in FIGURE 1, the annular extension 46 is snugly received and fixed within the annular recess defined between exterior surface of flange 23 and the interior surface of the wall 26. The extension 48 is similarly received within the annular recess defined between the exterior surface of flange 30 and the interior surface of wall 34. The overall axial length of bushing 18 is slightly greater than the axial spacing between the end walls of these two annular recesses so that bushing 18 is subjected to a slight axial compression when the casing 12 is assembled as shown in FIGURE 1.

As has heretofore been mentioned, walls 26 and 34 extend from the outer peripheries of radial walls 24 and 32 toward the center of the valve but at a slight angle outwardly from the axis of annular flanges 23 and 30, that is, they together form a conical or conoidal structure. This results in the formation of an annular chamber 57 between the outer periphery (surface 19) of bushing 18 and the inner faces of walls 26 and 34, said chamber having a maximum radial depth at the junction of walls 26 and 34 and a minimum radial depth at the ends of bushing 18. Since each of said walls 24 and 32 diverge at the same angle, the depths of correspondingly spaced portions of chamber 57 on each side of its radial center line is identical. Hydraulic or pneumatic fluid is introduced into the chamber 57 through inlet port 58 of attachment fitting 60 rigidly secured to and preferably integral with the wall 34. In lieu of hydraulic or pneumatic fluid, air under pressure may be used. Inlet port 58 opens at its interior end directly into chamber 57.

Figure 3:
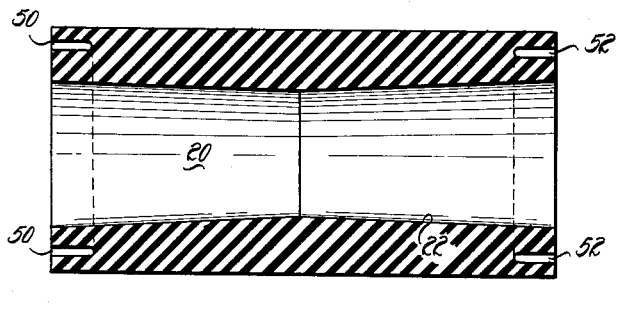
FIGURE 3 is an axial sectional view of the inner molded sleeve of the valve of FIGURE 1.
Figure 4:
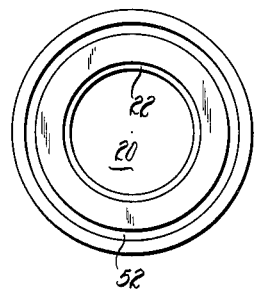
FIGURE 4 is an end view of the sleeve of FIGURE 3.

As is illustrated in FIGURES 1, 3 and 4, inner sleeve 20 is an annulus having a cylindrical exterior wall and inner walls tapering slightly outwardly in each direction from its longitudinal center to define a converging-diverging passage. Its length is slightly greater than the overall axial length of casing 12 as assembled and its outer diameter such that on the one hand it may be readily inserted into the cylindrical bore defined by the concentric, equal diameter inner cylindrical faces 25 and 31 of annular flanges 23 and 30 but will, on the other hand, fit snugly against inner faces 25 and 31 and the inner face 17 of bushing 18. An outer diameter having a minus tolerance of 1/16″ to 3/32″ has been found to be suitable for optimum results. In its unstressed condition in assembly, inner face 17 of bushing 18 is concentric with and of equal diameter to inner faces 25 and 31. Formed in the opposite end walls of sleeve 20 are annular grooves 50 and 52 which are adapted to receive metal retaining rings 54 and 56, shown in FIGURE 1.

Opposite axially projecting hubs or bosses 62 and 64 are annularly recessed on their inner faces to form annular shoulders 66 and 68. Metal retaining rings 54 and 56 are of a diameter such that when inserted into annular grooves 50 and 52 on sleeve 20 the radially outer portion of the ends of inner sleeve 20 are expanded radially to flare outwardly beyond shoulders 66 and 68 into the recesses on hubs 62 and 64, thus forming an interlock therewith and preventing axial inward slippage of the opposite end regions of the inner sleeve relative to the casing parts 14 and 16.

Annular notches 65 in the outer face of retaining rings 54 and 56 tend to ensure the retention of the retaining rings when the valve assembly 12 is disconnected from the connecting line flanges 70 by their cooperation with the elastomeric inner sleeve 20, which tends when forced against said notches to "fill" them and to thereby provide an interlocking effect. Additional retaining force is provided by the compression of the connecting line flanges (not shown) against the ends of the inner sleeve 20. Annular notches 65 also serve to facilitate removal of retaining rings 54 and 56; the retaining rings can easily be pried out of annular grooves 50 and 52 in inner sleeve 20 by forcing a screw driver or similar instrument into one of the annular notches 65 and prying the rings loose.

In operation, the chamber 57 is normally filled with hydraulic fluid and further hydraulic fluid is introduced into the chamber 57 through inlet port 58 under pressure to apply a radially inwardly directed uniformly distributed pressure to the outer periphery 19 of bushing 18 about its entire circumference. Castor oil is preferred because of its compatibility with pure gum rubber. A hydraulic pumping system generally comprising a pump and a fluid reservoir may be employed to pump the hydraulic fluid into inlet port 58. Details of such a system are described in copending application Serial No. 661,488.

The application of this radial pressure circumferentially to the outer periphery of bushing 18 will produce radial compression of said bushing with movement of the central portion 42 radially toward the center line of inner sleeve 20, while maintaining uninterrupted surface to surface frictional contact therebetween in an annular band and, as the pressure is increased, will force inner sleeve 20 to arc inwardly at its longitudinal center to gradually decrease the size of the cross-sectional area of the opening 22 at the center of its longitudinal dimension. That is, inner-sleeve 20 is, through the action of bushing 18, subjected at its longitudinal central region to a uniformly distributed radially directed inward compressive force about an annular central band to constrict it and the size of the opening through its central portion. With the outer bushing 18 and inner sleeve 20 properly constructed as will be described in detail presently in accordance with the present invention, radial compression of the outer bushing 18 may be effected over a major portion of the range between the full flow position of inner sleeve 20 and its shut-off condition while maintaining true circularity of the minimum diameter cross section of the opening 22 and providing a converging-diverging passage for fluid in the form of a venturi opening.

For example, if the diameter of opening 22 is 5 inches in the fully open condition of sleeve 20, bushing 18 can be radially compressed until the region of maximum convergence of the port 22 is reduced to a diameter of approximately 1.5 inches while maintaining true circularity of this region of maximum convergence. This represents a reduction in diameter of 70% of the port opening while maintaining true circularity of the region of maximum convergence. When the central portion 42 is further compressed beyond this condition, substantial circularity will be maintained to at least an 84% reduction of the full port opening, but beyond this point, it will rapidly collapse from its circular configuration to a polygonal shape and eventually to a fully cut-off condition.

As pressure is relieved within the chamber 57, the reverse operation occurs. That is, as the pressure is relieved, the central portion 42 of the bushing 18 will expand and the inner sleeve 20 will assume substantial circularity of its port at approximately 16% of the full flow open diameter of the port 22, and true circularity at approximately 30% of the full flow open diameter of said port, and will gradually increase as the pressure is relieved providing a circular venturi opening of gradually increasing diameter. This construction provides an effective control range between a maximum diameter and approximately 16% of that maximum diameter and provides true circularity of port 22 between a maximum diameter and approximately 30% of that diameter. This range is entirely adequate for practically all control installations.

Particular note should be taken of the dual taper of the inner wall of inner sleeve 20. The arch formed by the tapered design at the midpoint of the sleeve provides a venturi-effect when fluid passes through the sleeve in that there will be a low pressure area at that point. Since it is the pressure at that point which must be overcome by the hydraulic pressure to constrict the port opening of inner sleeve 20 a lesser hydraulic pressure for a given flow is required using the foregoing construction than would be required with a completely cylindrical or non-tapered inner wall. In addition, the arch or buttress design adds structural strength to the inner sleeve and provides more stock at the point of potentially greatest wear. It should also be noted that if the radially inward constricting pressure on outer bushing 18 is relieved sufficiently and the line pressure increases correspondingly, port 22 can expand to full line size by virtue of this arch.

A primary factor in providing circularity of the port opening through a wide range of constriction is the relationship between the diameter of the port 22 at the fully relaxed condition of inner sleeve 20, the radial thicknesses of inner sleeve 20 and the central portion 42 of outer bushing 18, and the distance between the tips of annular flanges 23 and 30. Generally speaking, when the ratio of the diameter of port 22 (at its fully relaxed condition) to the combined radial wall thicknesses of inner sleeve 20 and outer bushing 18 is 1:1 and the distance between the tips of annular flanges 23 and 30 is equal to the port diameter, final closure (through the last 25% reduction of port cross-sectional area) holds to a more symmetrical folding and centered pattern.

In practice, however, it has been observed that the following relative dimensions produce satisfactory results:

| Inner Diameter of Inner Sleeve 20, inches | Outer Diameter of Outer Bushing 18, inches |
|---|---|
| 1½ | 4.5 |
| 2 | 5.875 |
| 3 | 8.5 |
| 4 | 10.0 |

Port to bushing outer diameter ratios for 5" and 6" ports (inner diameters of inner sleeve 20) are approximately the same as that for the 4" port. One of the reasons, of course, for reducing the above ratio in the case of the larger port diameters is to reduce the overall size of the valve.

A number of variables influence the choice of the relative radial wall thicknesses of inner sleeve 20 and outer bushing 18. For example, the radial wall thickness of inner sleeve 20 must not be so small that the sleeve would collapse radially and perhaps fold-up longitudinally when constricting force is applied. Also, it must be borne in mind that since the inner diameter of outer bushing 18 has been increased to accommodate inner sleeve 20, the outer bushing could not itself, that is, without the inner sleeve 20, go to full closure without severe stress on the rubber of which it is made. Therefore, inner sleeve 20 must be at least thick enough to completely effect the port closure function with only moderate inward radial displacement of the central portion of outer bushing 18. Also influencing the choice of radial wall thickness of inner sleeve 20 are the facts that: (1) the sleeve must be thick enough to provide good spacing for retaining rings 54 and 56, with an adequate amount of rubber radially available on each side of said rings; (2) the inner sleeve must be thick enough to provide longitudinal stability between connecting line flange faces 70; and (3) the maximum thickness of the sleeve must be sufficiently small that its outer diameter is less than the tapped bolt circle diameter of the connecting line flange face. In light of the latter fact, sufficient metal wall is left between the annular recesses on the inner faces of bosses 62 and 64 and the tapped bolt hole to allow for adequate strength in said metal wall.

Once the radial wall thickness of inner sleeve 20 has been chosen, the outer bushing 18 is designed to provide the combined wall thickness required for round port closure, in accordance with the port to wall thickness ratios set forth above. Reasonable deviations in all of the above design features are, of course, permissible to obtain the most economical production features predicated on standard bolt circle dimensions, casting and mold designs, etc.

As was described above, inner sleeve 20 is held in place in casing 12 by means of retaining rings 54 and 56. When hydraulic pressure is applied to the outer periphery 19 of bushing 18, causing radial compression and constriction of inner sleeve 20, the latter will become elongated axially and, if not axially confined when constricted to near-closure, will protrude as much as ¾″ beyond each end of casing 12. In view of this fact, removal and insertion of inner sleeve 20 is easily effected. To remove the inner sleeve, pressure is applied to the near-closure point and one of the retaining rings is removed from the annular groove in which it sits. The pressure is removed and the inner sleeve is readily pushed out of casing 12 in a direction toward the end of the sleeve with the remaining retaining ring.

To insert a new inner sleeve, a similar procedure is followed. The sleeve is inserted into casting 12 and hydraulic pressure is applied to the outer periphery 19 of bushing 18, until the inner sleeve 20 is at its near-closure point. The resulting axial elongation of inner sleeve 20 will permit the easy insertion of retaining rings 54 and 56 into annular grooves 50 and 52 in the protruding ends of said sleeve. When the hydraulic pressure is released, the inner sleeve will contract and its ends will be flared outwardly by the retaining rings beyond shoulders 66 and 68 into the recesses on hubs 62 and 64.

It will be noted that the axial elongation of the inner sleeve 20 upon compression thereof also serves to further secure and seal the sleeve at the peak of static plus surge pressure conditions in relation to the opposed ends of the conduits of the pipe line in which it is interposed by increasing the axial compression of the ends of said sleeve 20 against the opposed parallel faces of the connecting line flanges 70.

As was pointed out at the outset hereof, in many installations the line fluid passing through a valve of this type will be contaminated if the inner sleeve 20 is formed of pure gum rubber. It is important on a properly functioning valve of this type that pure gum rubber be used as the matterial of which bushing 18 is formed to provide the memory and resilience required to restore the bushing 18 and inner sleeve 20 to their initial condition to provide a full open port upon relief of the pressure within chamber 57.

In copending application Serial No. 661,488, the problem was overcome by using a unitary laminated sleeve whose innermost portion was composed of a resilient inert material such as 100% neoprene rubber and whose outermost layer was composed of pure gum rubber, with varying combinations of the two being sandwiched between the two.

The instant embodiment incorporates the broad principles and advantages of the pure gum rubber-inert resilient material combination of application Serial No. 661,-488, while providing simplicity of design and reducing production and maintenance problems and costs. More specifically, the inner sleeve 20 is composed entirely of an inert, resilient, rubber-like material and the outer bushing 18 is composed entirely of pure gum rubber. While the inert, resilient material of the inner sleeve 20 may be 100% neoprene, as in application Serial No. 661,-488, any rubber-like material may be used which is resistant to deterioration from abrasion or chemical action under the service conditions in which it will be used. Since the inner sleeve 20 and outer bushing 18 are each of unitary construction, they may be inexpensively formed by molding or the like. Grooves 50 and 52 in inner sleeve 20 may also be formed as sleeve 20 is molded as is shown in FIGURE 3.

As has been set forth above, the length of bushing 18 is slightly greater than the axial spacing between radial walls 24 and 32 when casing halves 14 and 16 are assembled. This provision is important, since for the outer bushing 18 to function as a constrictor, it must be confined and forced between the fixed space of the inner case. When so confined, it will grip and compress the inner sleeve 20 in uniformly circular fashion when the hydraulic pressure is applied and effect a truly circular port 22 through the sleeve.

In prior art structures, such as that of the Swedish patent, wherein a unitary sleeve was used to obtain the desired results, the foregoing requirement made it extremely difficult to remove the sleeve from the casing due to the high friction between the bushing and casing and necessitated drainage of the hydraulic actuating fluid from the valve. With a two-piece structure such as that of the instant case, these problems are avoided due to the ease with which the separate inner sleeve 20 may be moved into and out of casing 12 and the fact that drainage of the hydraulic actuating fluid is unnecessary.

To assure ease of removal of outer bushing 18, however, casing 16 has been formed by two parts which are separable intermediate the ends of bushing 18, preferably at the center thereof. Disassembly of this valve may be effected by removing the bolts 38 about the flanges 28 and 36 and separating casing parts 14 and 16. A screw fitting may then be inserted within the tapped opening for plugs 76 and 78 and a source of air pressure connected first to one and then the other by suitable coupling hose. When air is applied through the opening for plugs 76, air acts upon the radial end face of extension 48 of bushing 18 and forces it from the annular recess defined between annular flange 30, radial wall 32 and conical wall 34 in much the same manner that an annular piston would be moved through an annular chamber. The extension 46 may be similarly forced from the annular recess in which it sits by the application of air pressure through the tapped opening for plug 78.

The centrally split casing 12 has a further advantage in that the casing parting plane and the casing pressure chambers are completely isolated by bushing 18 and inner sleeve 20 from the line fluid so that contamination of either the line fluid by the pressure fluid or vice versa or leakage of line fluid from the casing is impossible.

Removal of outer bushing 18 from the valve casing is further facilitated by the design feature providing diverging walls 26 and 34 to form a conical or conoidal structure rather than a wall design such as that shown in copending patent application Serial No. 661,488. As is evident from FIGURE 1, outer bushing 18 will be readily removable from the casing when casing parts 14 and 16 are separated in view of this design feature.

In addition, the use of a casing with diverging walls such as walls 26 and 34 facilitates its manufacture by permitting the ready removal of the die used to form the casing.

From the foregoing, it may be seen that the improved construction of the instant radially constrictible unobstructed venturi valve represents a marked advance over similar prior art structures. Not only does a two-piece sleeve-bushing construction provide for ease of replacement without the necessity of draining of hydraulic fluid and disassembly of the entire device but, and more significant, such a construction permits the use of substantially lower hydraulic pressures for control and closing than has been the case in the past. Specifically, the pressure required to control and fully close the instant valve is approximately 30% of that required in the device of copending application Serial No. 661,488. Furthermore, the true venturi-like flow pattern is maintained through a wider range of adjustment in the instant case than in the case of the device of said copending application. The present design permits the maintenance of a truly round port opening from the full open position of the inner sleeve to an approximately 70% reduction in port diameter. Such a wide range of effectiveness was not obtainable even in the improved device of said copending application.

The increased inner sleeve length provides not only for increased protection to metal parts which would otherwise be easily abraded and corroded but also contributes to producing a more streamlined venturi-like closure which, in turn, results in a more laminar flow of fluids therethrough.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flow control valve comprising a thick-walled substantially cylindrical tube consisting of rubber-like elastomeric material and having rigidly circumferentially supported axially spaced end regions and an unsupported circumferentially compressible central region; an annular thick walled constrictor element of elastomeric material separable from said tube and surrounding said tube central region in uninterrupted band of surface to surface contact therewith; a rigid casing surrounding said tube and element, means fixing the ends of said tube to said casing, and selectively operative means for causing said element to exert a circumferentially uniform radially directed compressive force upon said tube within said band.

2. A control valve comprising a thick-walled tubular constrictor element; a rigid casing surrounding, axially confining, and radially internally supporting the end regions of said element and defining with the external periphery of said element a fluid chamber about the central regions thereof intermediate said end regions in which fluid pressure can be selectively varied to control the constricting circumferential compressive force applied to the unsupported central region of said element, said casing and said element defining a rectilinear through opening; a tubular thick-walled elastomeric liner disposed within, extending from end to end of, and snugly fitting the wall of said opening; and means for radially supporting the end regions of said liner within said casing, said liner being provided with a uniformly converging-diverging passage between the ends of said casing, and means including said fluid chamber for selectively varying the cross-section of said liner in response to changes in pressure of fluid within said chamber.

3. In combination, a pair of axially spaced concentric conduits; a thick-walled substantially cylindrical member consisting of elastomeric material and interconnecting the adjacent ends of the said conduits extending and slightly axially compressed between said ends; means for circumferentially supporting the opposite ends of said member against radial compression; and selectively operative means for subjecting an unsupported central region of said member to uniform circumferential compression to constrict the opening therethrough at said central region, the wall thickness of said tubular member being such that circumferential compression thereof creates an axial expansion stress in said member to increase the compressive force between the ends thereof and the ends of said conduits.

4. A valve comprising a first annular tubular resilient body defining a substantially unobstructed fluid passage of circular cross section; a casing surrounding said first body; means securing the end regions of said first body to said casing in substantially fixed and fluid-tight relation thereto comprising a pair of annuli, each annulus being removably mounted in an end of said body; a second annular body structurally distinct from said first body and secured at its opposite ends in said casing in concentric surrounding relation to at least a central portion of said first body and having an exterior central portion in circumferentially spaced relation to the interior of said casing to define with said casing an annular fluid chamber into which fluid under pressure can be introduced to apply a radial compressive force to said second body to radially compress said first and second annular bodies to constrict the opening through said first body; said second body being of substantially greater radial wall thickness at the region thereof adjacent the longitudinal center thereof than the wall thickness of said first body at the portion thereof within said second body central portion; each body being of sufficient radial wall thickness to permit substantial radial compression thereof without distortion of the cross-sectional configuration thereof; said casing having a fluid port therethrough opening into said fluid chamber to permit ingress and egress of fluid under pressure to and from said chamber.

5. The valve of claim 4 wherein means are provided in said casing whereby the ends of said first sleeve may flare outwardly when said annuli are mounted therein, whereby axial movement of said first sleeve is limited.

6. A valve assembly comprising a flexible substantially cylindrical body defining a substantially unobstructed fluid passage and having a radial wall thickness sufficiently great relative to the radius of said passage that circumferential compression of said body tends to produce axial elongation thereof; a casing surrounding said body; means securing the end regions of said body in substantially fixed and fluid-tight relation thereto comprising a pair of annuli, said annuli being removably mounted in the opposite end faces of said body; and means in said casing whereby the ends of said annular body may flare radially outwardly when said annuli are mounted therein, whereby axial converging movement of the ends of said annular body is limited.

7. A valve comprising a tubular solid thick walled elastomeric structure; a casing surrounding said structure; the ends of said structure being internally radially supported by and frictionally secured in fixed axially spaced relation in and to said casing; said casing being formed of two separable parts, the parting surfaces of which extend transversely of the longitudinal dimension of said tubular structure and lie substantially intermediate its end; the outer wall of each part of said casing diverging radially outwardly from an end of said tubular structure towards the center thereof to define with said structure an annular fluid chamber and to facilitate removal of said structure when the casing is dismantled.

8. A valve assembly comprising a flexible annular body defining a substantially unobstructed fluid passage; a casing surrounding said body; means securing the end regions of said body in substantially fixed and fluid tight relation thereto comprising a pair of annuli, each annulus being removably mounted in an end of said body; means in said casing whereby the ends of said annular body may flare radially outwardly when said annuli are mounted therein, whereby axial movement of said annular body is limited, means for applying circumferentially a radially compressive force to a central portion of said annular body to radially compress said central portion and axially elongate said annular body to disengage the ends of said annular body from said means in said casing whereby said annuli may be readily withdrawn from or inserted into each of the end wall of said annular body, said means for applying said circumferentially radial force comprising a second annular body secured at its opposite ends in said casing in concentric surrounding relation to at least a central portion of said first body; and means to apply circumferentially a radial compressive force to said second body.

9. A valve assembly comprising a flexible annular body defining a substantially unobstructed fluid passage; a casing surrounding said body; means securing the end regions of said body in substantially fixed and fluid tight relation thereto comprising a pair of annuli, each annulus being removably mounted in an end of said body; and means in said casing whereby the ends of said annular body may flare radially outwardly when said annuli are mounted therein, whereby axial movement of said annular body is limited, means for applying circumferentially a radial compressive force to a central portion of said annular body to radially compress said central portion and axially elongate said annular body to disengage the ends of said annular body from said means in said casing whereby said annuli may be readily withdrawn from or inserted into each of the end walls of said annular body, said annuli being provided with grooves or portions of their surface which physically contact said first body whereby said annuli will be more securely mounted within said first body.

10. A valve comprising a tubular constrictor element having an unobstructed passage therethrough; means surrounding, axially confining, and radially internally supporting the end regions of said element and defining with the external periphery of said element a fluid chamber about the central regions thereof intermediate said end regions in which fluid pressure can be selectively varied to control the constricting circumferential compressive force applied to the unsupported central region of said element, said means and the interior surface of the unsupported central region of said element defining a rectilinear through opening; a tubular liner consisting of elastomeric material disposed within, extending from end to end of, and snugly fitting the wall of said opening; means for radially supporting the end regions of said liner within said first mentioned means, and means including said fluid chamber for selectively varying the cross section of said liner in response to changes in pressure of fluid within said chamber.

11. A valve assembly comprising a flexible, substantially cylindrical body defining a substantially unobstructed fluid passage and having a radial wall thickness sufficiently great relative to the radius of said passage that radial compression of said body tends to produce axial elongation thereof, a casing surrounding said body, means securing the end regions of said body in substantially fixed and fluid tight relation thereto comprising a pair of annuli, said annuli being removably mounted in the opposite end faces of said body, means in said casing whereby the ends of said annular body may flare radially outwardly when said annuli are mounted therein whereby axial converging movement of the ends of said annular body is limited and means for applying a radial force to a central portion of said annular body to radially compress said central portion and constrict the size of the passage therethrough.

References Cited in the file of this patent

UNITED STATES PATENTS

| | | |
|---|---|---|
| 1,733,180 | Biedermann | Oct. 29, 1929 |
| 2,066,544 | Shaw | Jan. 5, 1937 |
| 2,163,007 | O'Dell | June 20, 1939 |
| 2,434,835 | Colley | Jan. 20, 1948 |
| 2,470,744 | Korn | May 17, 1949 |
| 2,518,625 | Langstaff | Aug. 15, 1950 |
| 2,556,183 | Hapman | June 12, 1951 |
| 2,843,349 | Meyer | July 15, 1955 |
| 2,716,575 | Vickers | Aug. 30, 1955 |
| 2,904,063 | Wall | Sept. 15, 1959 |
| 2,945,665 | Regan | July 19, 1960 |

FOREIGN PATENTS

| | | |
|---|---|---|
| 210,521 | Great Britain | Feb. 1, 1924 |
| 325,162 | Italy | Mar. 2, 1935 |
| 132,054 | Sweden | June 19, 1951 |
| 1,140,385 | France | Mar. 4, 1957 |